United States Patent
Boettiger

(10) Patent No.: US 8,052,056 B2
(45) Date of Patent: Nov. 8, 2011

(54) APPARATUS AND METHOD OF ENTERING AN AUTHORIZATION CODE INTO A CARD TERMINAL

(75) Inventor: Volcker Boettiger, Munich (DE)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 12/339,661

(22) Filed: Dec. 19, 2008

(65) Prior Publication Data
US 2009/0134216 A1    May 28, 2009

Related U.S. Application Data

(63) Continuation of application No. 10/714,289, filed on Nov. 13, 2003, now Pat. No. 7,478,752.

(30) Foreign Application Priority Data

Dec. 18, 2002    (EP) ..................................... 02102795

(51) Int. Cl.
G06K 7/08    (2006.01)
(52) U.S. Cl. .......................... 235/451; 235/492; 235/380
(58) Field of Classification Search .................. 235/451, 235/492, 380
See application file for complete search history.

(56) References Cited

U.S. PATENT DOCUMENTS

| | | | |
|---|---|---|---|
| 3,641,499 A | 2/1972 | Housman | |
| 4,839,506 A | 6/1989 | Homma et al. | |
| 5,017,766 A | 5/1991 | Tamada et al. | |
| 5,034,597 A | 7/1991 | Atsumi et al. | |
| 5,050,207 A | 9/1991 | Hitchcock | |
| 5,130,519 A * | 7/1992 | Bush et al. | 235/380 |
| 5,180,902 A | 1/1993 | Schick et al. | |
| 5,239,166 A | 8/1993 | Graves | |
| 5,285,055 A * | 2/1994 | Oonakahara et al. | 235/380 |
| 5,365,046 A | 11/1994 | Haymann | |
| 5,450,491 A | 9/1995 | McNair | |
| 5,478,994 A | 12/1995 | Rahman et al. | |
| 5,627,355 A | 5/1997 | Rahman et al. | |
| 5,698,836 A | 12/1997 | Fujioka | |
| 5,877,482 A | 3/1999 | Reilly | |
| 6,188,309 B1 | 2/2001 | Levine | |
| 6,523,754 B2 | 2/2003 | Hoshino et al. | |
| 6,641,050 B2 | 11/2003 | Kelley et al. | |

OTHER PUBLICATIONS

Security Dynamics "Controlling Access to the Corporate Network", 1997, pp. 1 through 8.
David B. everett "Smart Card Tutorial", 1992 and 1993, Parts 1 and 9 (full text at heep://www.smartcard.co.uk/tutorials/sct-itsc.pdf).
USPTO Official Action in parent application U.S. Appl. No. 10/714,289 dated Jun. 15, 2005. USPTO Official Action in parent application U.S. Appl. No. 10/714,289 dated Nov. 9, 2005.
USPTO Official Action in parent application U.S. Appl. No. 10/714,289 dated Apr. 29, 2008.
USPTO Official Action in parent application U.S. Appl. No. 12/134,345 dated Jun. 22, 2010.
USPTO Notice of Allowance in parent application U.S. Appl. No. 10/714,289 dated Sep. 11, 2008.
USPTO Notice of Allowance in parent application U.S. Appl. No. 12/134,345 dated Oct. 13, 2010.

* cited by examiner

*Primary Examiner* — Ahshik Kim
(74) *Attorney, Agent, or Firm* — John Pivnichy; Daniel E. McConnell

(57) ABSTRACT

An authorization code is entered into a card terminal reader from a security card. The authorization code is first entered into a card and stored in a secret memory location or stored into or onto the card with a alternate element. A characteristic physical state of an element on the card is temporarily changed from a first state to a second state. When the card is inserted into a card reader terminal within a pre-defined period of time, the authorization code is transmitted to the card reader terminal and the state is reset from the second state to the first state.

13 Claims, 2 Drawing Sheets

APPARATUS AND METHOD OF ENTERING AN AUTHORIZATION CODE INTO A CARD TERMINAL

RELATED APPLICATION

This application is a continuation-in-part of application Ser. No. 12/134,345 filed 6 Jun. 2008, which in turn is a continuation of application Ser. No. 10/714,289 filed 13 Nov. 2003 which claims priority from DE 02102795.8 filed 18 Dec. 2002.

TECHNICAL FIELD

The present invention relates to the field of security cards, the subset of which that carry embedded chips also being referred to as smart cards, data cards or integrated circuit cards, and more particularly, to security card authentication. The security cards may be used for financial purposes, such as banking cards, and for controlled access to secure buildings or building areas.

BACKGROUND OF THE INVENTION

The use of security cards is wide spread for a variety of applications, including electronic payment, electronic cash and access control systems. Typically a user has to insert the card into a terminal having a card reader. In order to enable a desired financial transaction the user frequently has to input an authorization code into a keyboard of the terminal.

When the user has entered a valid authorization code the transaction is enabled. For example, payments at gas stations or other points of sales are usually performed this way by means of a credit card having an integrated circuit chip. The typical method for authenticating the user to the card by means of an authorization code involves the input of a personal identification number (PIN) into the terminal. The PIN is verified by means of the card. This verification is done by comparing the PIN with a reference PIN stored in a secret area of non-volatile memory of the card.

This usual procedure of using smart cards for providing payments at points of sale has several security risks. One risk is that the user inputs his or her PIN information through the keyboard of the terminal which is owned by a third party. The keyboard can be tampered with by the third party to read the user PIN number.

Another risk is that the terminals are typically located in public areas with no or only limited confidentiality. When the user enters his or her PIN number by means of the keyboard of the chip card terminal this can be easily observed by other customers. Especially this situation can occur when customers are queuing up in front of a point of sale terminal.

Another disadvantage of entering the PIN number into the keyboard of the chip card terminal is that users frequently make mistakes when entering the PIN number or have forgotten the correct PIN number. This requires re-entering of the PIN number such that an extended period of time for the payment transaction is required. This is especially annoying for other customers who are standing in line in front of a crowded point of sale terminal, such as in a gas station or supermarket.

The present invention therefore aims to provide an improved method of entering an authorization code into a chip card terminal and a corresponding computer program and chip card.

SUMMARY OF THE INVENTION

The present invention provides for an improved method of entering an authorization code into a card reader terminal whereby the authorization code is not directly entered into the card reader terminal but into or onto the card itself. The authorization code is stored in a memory location of the card for a predetermined period of time. The storing is by changing a physical property of an element of the card.

During that period of time the authorization code can be transmitted from the memory location of the card to a card reader terminal. After the pre-defined period of time or after transmission of the authorization code the authorization code is erased from the memory location.

In accordance with one embodiment of the invention the authorization code is an authentication code, such as a PIN number. For access control applications, such as access control of buildings or other sites with restricted access, the authorization code can be a secret access code for authorizing access to the access-restricted site. Alternatively or in addition other data can be entered for transmission to the card reader terminal, such as a transaction number (TAN), a payment amount and/or a payment code indicating the purpose of the payment.

For example at a gas station the user can enter the number of the gasoline pump in addition to the PIN. The number of the gasoline pump is transmitted to the card reader terminal in addition to the PIN. This way it can be prevented that the wrong payment amount is deducted for another gasoline pump which the user has not used to fuel his or her car.

In accordance with a further preferred embodiment of the invention an aural, visual and/or haptic signal is outputted when the authorization code has been successfully entered into the card. For example the authorization code is verified by the card by means of reference verification data stored in a secured area of the memory of the card.

After successful verification the output signal is generated in order to inform the user that he or she entered a valid authorization code and that the card is in a state enabling the transmission of the previously entered authorization code to a card terminal. This way it can be prevented that the user has to re-enter his or her authorization code at the point of sale when a number of other users are waiting in line behind the user.

In accordance with a further embodiment of the invention the signal is switched off after a pre-defined period of time or after the transmission of the authorization code to the card terminal has been successfully completed, whichever occurs earlier.

In accordance with a further embodiment of the invention the user needs to continuously perform a pre-defined input action to maintain the enabling state of the card. For example, the user has to place his or her digit on a sensor element on the card, such as a photo element. When the user removes his or her finger from that sensor the card is reset and the transmission of the authorization code to a card reader terminal is disabled. This way misuse of the card after the authorization code has been entered is prevented.

In accordance with another embodiment of the invention a bending or flexural sensor or switch is provided to detect an unsecure situation. For example if an attacker tries to take away the card from the user by physical force the card will undergo an elastic deformation which is sensed such that the authorization code is erased from the memory location of the card.

In accordance with a further embodiment of the invention various elements of the user interface are not integrated into the card itself but in an electronic wallet. The electronic wallet has a slot for inserting the card in order to connect the card to the various external interface units. For example the electronic wallet can have a keyboard and a display which are connected to the card when the card is inserted in the electronic wallet.

In accordance with a further embodiment of the invention the card is also used for service functions such as changing a PIN. The new PIN is entered into the card by means of the keyboard of the card or through the electronic wallet and confirmed.

It is to be noted that the present invention is particularly advantageous for making the usage of cards more secure and convenient. In particular the present invention provides for improved protection of the confidentiality of the authorization code.

Another advantage is that the transaction time for providing a payment at a point of sale is reduced as manually entering the authorization code in the card terminal at the points of sale and re-entering of a previously incorrectly entered authorization code can be prevented.

BRIEF DESCRIPTION OF THE DRAWINGS

The following embodiments of the invention will be described in greater detail by making reference to the drawings in which.

DETAILED DESCRIPTION OF THE INVENTION

Figure 1:
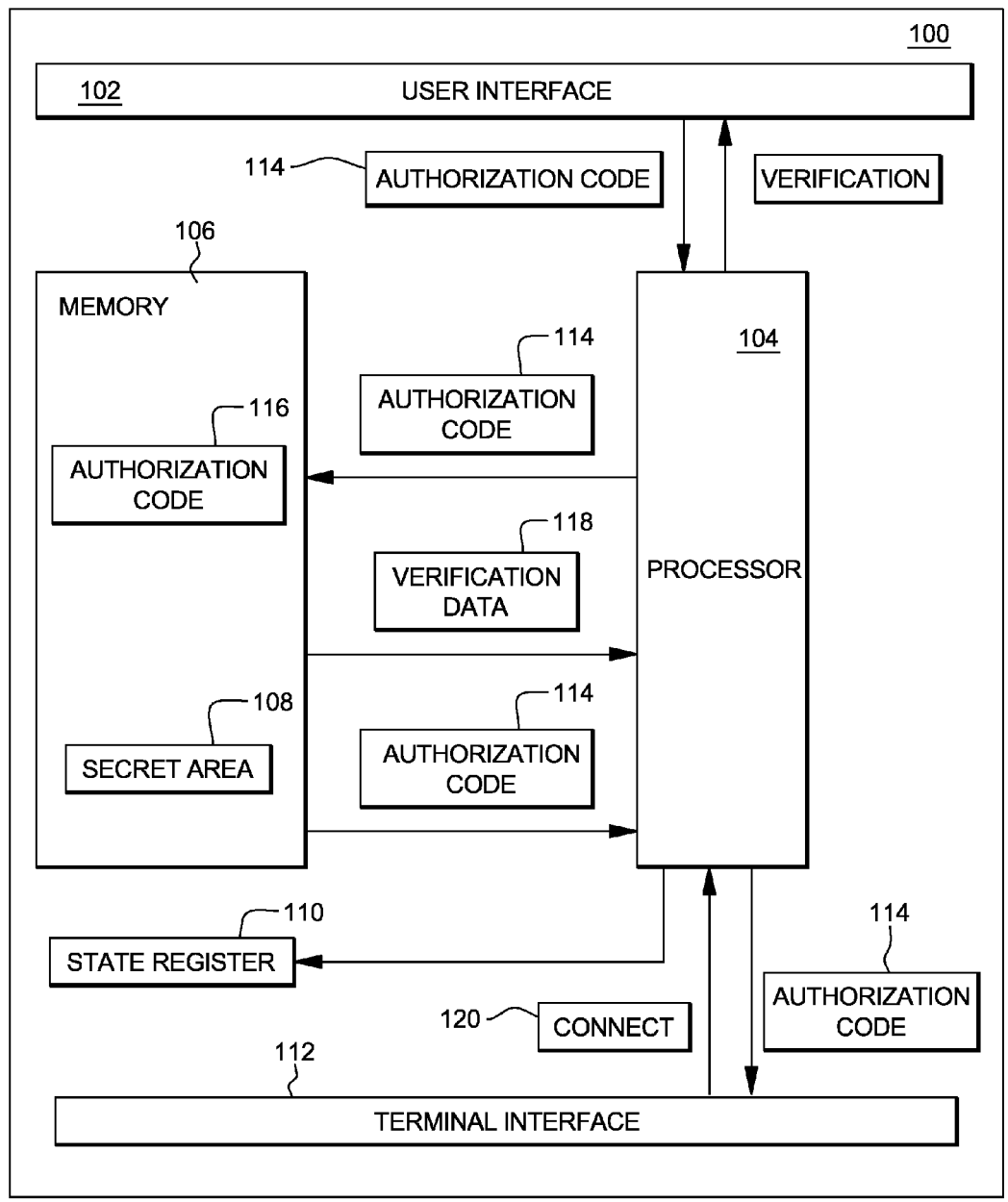
FIG. 1 is a block diagram of an embodiment of a card.

FIG. 1 schematically shows a card 100. Card 100 has a user interface 102. User interface 102 can comprise various elements, such as a keyboard, a display unit, a speaker, a light emitting diode and/or other input and output devices for providing an interface to the user. All of the elements of the user interface 102 can be integrated into the card 100.

Alternatively some or all of the elements of user interface 102 can be provided by an electronic wallet. In this instance the card 100 needs to be inserted into the electronic wallet in order to couple the card 100 to the respective user interface devices.

Further card 100 has a microprocessor 104 which is or can be coupled to user interface 102. Microprocessor 104 is coupled to memory 106 of the card 100. Memory 106 has non-volatile, secret memory location 108 for storage of secret data. For example a reference authorization code is stored in memory location 108. For improved protection of the reference authorization code it is preferred that the reference authorization code is encrypted.

Card 100 has a state register 110 which is coupled to microprocessor 104. State register 110 serves to store state information which indicates whether the card 100 is enabled to transmit the authorization code to a card reader terminal.

Further the card 100 has a terminal interface 112. The terminal interface 112 serves to couple the card 100 to an external card reader terminal.

In operation a user of the card 100 inputs an authorization code, such as a PIN number, via user interface 102. From user interface 102 the authorization code 114, which has been inputted by the user, is provided to processor 104 which stores authorization code 114 in memory location 116 of memory 106.

Next processor 104 reads verification data 118 from secret memory location 108. For example verification data 118 contains an encrypted reference authorization code. Processor 104 decrypts the reference authorization code contained in verification data 118 and compares reference authorization code and authorization code 114. If both codes are the same authorization is completed.

In response processor 104 writes a status bit to state register 110. The status bit indicates that transmission of the authorization code 114 from memory location 116 to an external card reader terminal is enabled. Further processor 104 starts a timer to which the processor is responsive. Preferably processor 104 provides on output signal to user interface 102 in order to inform the user that the entered authorization code 114 is correct and that the transmission of the authorization code 114 is enabled.

After the pin is entered, for instance by using an electronic wallet and after the card is taken out of the electronic wallet (or similar device), the timer needs to run, even when the card is not equipped with an electric power source, such as a battery. It should be therefore understood that the "timer" can be implemented as a simple capacitor. The capacitor is charged when the pin is entered. This could be done with user control to fully or partially charge the capacitor when different time values are desired. When the card is taken out, the electric charge on the capacitor will decay slowly. When the capacitor discharged totally, the pin is gone (when memory location 116 is powered by the capacitor as well), or will be defined as not valid. Thus the pin data will be gone after a while, even if the card is only held in the hand.

When the card 100 is subsequently inserted into the card reader of a terminal this is signaled to processor 104 from terminal interface 112 by means of signal 120 indicating the connection to the external card terminal. Next processor 104 checks state register 110 and the timer. When the status bit is set in state register 110 and the timer is not expired, processor 104 reads authorization code 114 from memory location 116 and transmits authorization code 114 via terminal interface 112 to the card terminal.

As a consequence the user does not need to enter authorization code 114 directly into the card terminal. This way the protection of the confidentiality of the authorization code 114 is improved. Another advantage is that other users who wait at a point of sale do not have to wait until user of card 100 has correctly entered his or her authorization code as the user can enter his or her authorization code 114 while standing in line in front of the point of sale check out terminal.

After transmission of the authorization code 114 or after the timer is expired, state register 110 is reset. Preferably processor 104 generates a corresponding output signal for user interface 102 in order to inform the user that the transmission is disabled now. Further the authorization code is erased from memory location 116.

As an alternative to the above described procedure an authorization signal is outputted from the card 100 to the external card terminal rather than the authorization code 114 itself. The authorization signal indicates to the external card terminal that the correct authorization code has been entered into the card and that authorization is complete. This has the additional advantage that when the card is stolen after entering the authorization code 114, the authorization code 114 is not outputted by the card.

The present invention contemplates extension of this security technology to cards which may lack some or all of the chip functionality described above. In particular, a short term memory present on the card for temporarily storing a pin, analogous to the memory 106 described above, is provided by other mechanisms and elements. These alternate elements store data by a change in a physical characteristic. For examples, the data may be stored using electrostatic charges or by luminance, visible or invisible, emitted for a limited time or by mechanical or tactile elements which may, for instance, comprise a stripe, field or edge of half-soft plastic modeling material or by a thermal element. The pin data can be stored on such cards in graphical form or in bar-code form.

In the electrostatic version for instance, a stripe on the card could hold electrostatic charges in a bar-code like form. A high-voltage, high-impedance charge is transferred to the card to form a bar-code like data band, or an electrostatic charge could be built up on the complete card by moving the card several times in and out of an appropriate electronic wallet or other housing. A stripe on the card could be photosensitive. When the card is then pulled out of the housing, a laser beam would neutralize the charge on the stripe partially, leaving an invisible, bar-code like data band.

In the version using luminescence, a stripe or field with phosphorescent pigments is prepared by a laser such that photons are emitted also in a bar-code like or graphical manner.

In the version using a configurable material, the pin is be stored in groove-like depressions into a half-soft plastic material. After a while, the material would flatten again by itself or would be flattened by a reader as the data is read. In that embodiment, the pin is randomly stored slightly on different positions on the card, not to reveal information due to normal wear.

In the version using thermal means, the information will be written and sensed back in a bar-code like or graphical manner. Appropriate bands or dots will be heated by a laser or the like and retain an elevated temperature for sufficient time to permit transfer of the data to a reader.

Figure 2:
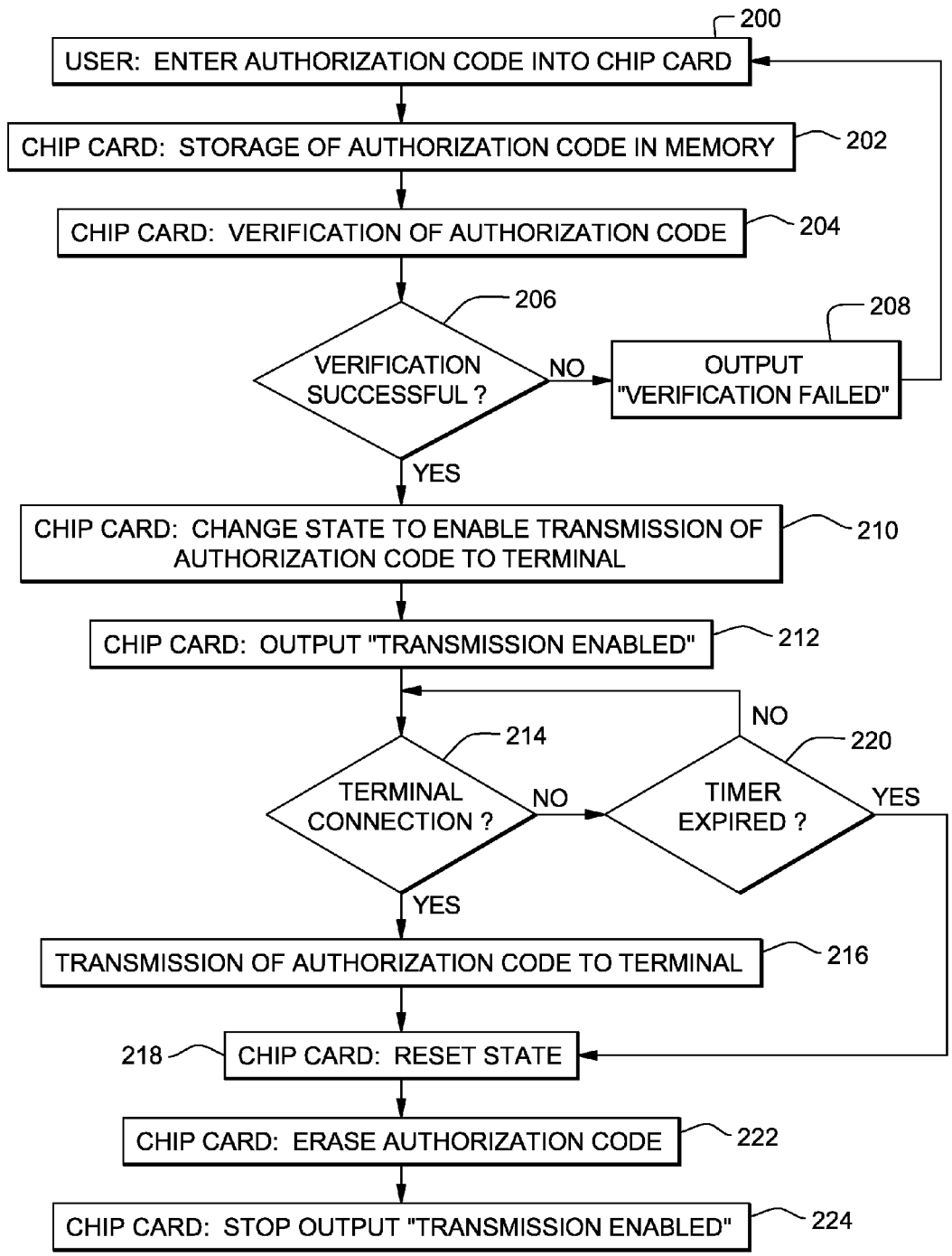
FIG. 2 is illustrative of a flow chart for performing a method of the invention.

FIG. 2 illustrates a corresponding flow chart for cards with a chip. In step 200 the user enters his or her authorization code into the chip card. In step 202 the authorization code is stored in an unsecure portion of the memory of the chip card. In step 204 the chip card verifies the authorization code by means of secret verification data which is stored in a secure memory location which is only accessible by the processor of the chip card.

If the verification in step 206 is not successful, i.e. the authorization card is not correct, a corresponding output message is provided to the user in step 208 and the user is prompted to re-enter its authorization code in step 200.

In case of successful verification the card changes its state in step 210 to enable the transmission of the authorization code to an external card reader terminal. For this purpose a corresponding output message is generated by the card such that the user is informed that the card is in an enabled state.

If a terminal connection is established in step 214, the authorization code is transmitted to the external card terminal in step 216 and the card resets its state in step 218.

If no terminal connection is detected in step 214, the control goes to step 220. If the timer has not expired yet, the control goes back to step 214 in order to check again whether a terminal connection has been established or not.

If it is determined in step 220 that the timer has expired, then control goes to step 218 in order to reset the state of the card in order to disable the transmission of the authorization code to the external card terminal.

In step 222 the authorization code in the non-secure memory location is erased by the card; this is necessary in order to ensure that the card is not misused if it gets into the possession of an unauthorized user. Further the output of the message "transmission enabled" via the user interface of the card is discontinued in step 224. Instead the message "transmission disabled" is displayed.

What is claimed is:

1. A security card for enabling a transaction, the card comprising:
   a user responsive interface by which an authorization code is entered;
   a memory which stores the authorization code on the card;
   a verification element which verifies the authorization code;
   an element on the card which has a physical characteristic which is changeable from a first state to a second state to enable transmission of the authorization code to a card reader terminal when the card is coupled to the card reader terminal within a predefined period of time and which is reset from the second to the first state after passage of the predetermined period of time; and an element on the card which detects an unsecure situation and erases the authorization code from the memory location, if an unsecure situation is detected.

2. A security card according to claim 1 further comprising an element which outputs an aural, visual or haptic signal when the state is changed from the first state to the second state.

3. A security card according to claim 1 wherein the element on the card which has a changeable physical characteristic maintains the second state only if a user continuously performs a predetermined input action during the pre-defined period of time.

4. A security card according to claim 1 further comprising a bending or flexural sensor or switch for detecting an unsecure situation and erasing the authorization code from the memory location, if an unsecure situation is detected.

5. A security card according to claim 1 wherein said element on the card which has a physical characteristic which is changeable from a first state to a second state comprises an element which receives an electrostatic charge patterned to convey the authorization code.

6. A security card according to claim 1 wherein said element on the card which has a physical characteristic which is changeable from a first state to a second state comprises an element which is excited to display luminance patterned to convey the authorization code.

7. A security card according to claim 1 wherein said element on the card which has a physical characteristic which is changeable from a first state to a second state comprises an element which receives transistory depressions patterned to convey the authorization code.

8. A security card according to claim 1 wherein said element on the card which has a physical characteristic which is changeable from a first state to a second state comprises an element which undergoes a change in temperature relative to the remainder of the card, the changed portions being patterned to convey the authorization code.

9. A method of entering an authorization code into a card terminal, the method comprising the steps of:
   entering the authorization code into a security card;
   storing the authorization code in a memory location of the card; and
   changing a characteristic physical state of an element of the card from a first state to a second state to enable transmission of the authorization code from the memory location to the banking card terminal when the banking card is coupled to the chip card terminal within a predefined period of time and resetting the physical state of the element from the second to the first state;

said characteristic physical state being a selected one of the group consisting of an electrostatic state, a luminance state, a surface texture state, and a temperature state.

10. A method according to claim 9 wherein the characteristic physical state which is changed is an electrostatic state.

11. A method according to claim 9 wherein the characteristic physical state which is changed is a luminance state.

12. A method according to claim 9 wherein the characteristic physical state which is changed is a surface texture state.

13. A method according to claim 9 wherein the characteristic physical state which is changed is a temperature state.

* * * * *